United States Patent [19]

Littlepage et al.

[11] Patent Number: 5,385,280

[45] Date of Patent: Jan. 31, 1995

[54] ADJUSTABLE BICYCLE CLAMP SUPPORT

[76] Inventors: Mike Littlepage, 2809 Woodbridge Ct., Modesto, Calif. 95355; Orville L. Keller, 28531 E. Lemon Ave., Escalon, Calif. 95320; Mary Conley, 6200 Snedigar Rd., Oakdale, Calif. 95361

[21] Appl. No.: 263,943

[22] Filed: Jun. 22, 1994

Related U.S. Application Data

[63] Continuation of Ser. No. 59,064, May 10, 1993, abandoned.

[51] Int. Cl.[6] .............................................. B60R 9/08
[52] U.S. Cl. .................... 224/42.45 R; 224/42.03 B; 269/71; 248/124
[58] Field of Search ........... 224/42.07, 42.08, 42.03 B, 224/42.03 A, 42.03 R, 42.45 R; 269/71; 211/182; 248/122, 124, 125

[56] References Cited

U.S. PATENT DOCUMENTS

| | | | |
|---|---|---|---|
| 1,776,890 | 9/1930 | Dart | 224/42.03 A |
| 3,981,491 | 9/1976 | Snyder | 269/64 |
| 4,593,840 | 6/1986 | Chown | 224/42.03 A |
| 4,630,990 | 12/1986 | Whiting | 224/420.3 R X |
| 4,671,478 | 6/1987 | Schoenig et al. | 248/124 |
| 4,676,414 | 6/1987 | Deguevara | 224/42.03 R |
| 4,856,686 | 8/1989 | Workentine | 224/42.07 |
| 4,967,942 | 11/1990 | McGruder | 224/42.03 R |
| 5,004,133 | 4/1991 | Wyers | 224/42.45 R |
| 5,067,641 | 11/1991 | Johnson et al. | 224/42.03 B |
| 5,181,681 | 1/1993 | Edwards | 248/125 |
| 5,215,234 | 6/1993 | Pasley | 224/42.43 |

FOREIGN PATENT DOCUMENTS

| | | | |
|---|---|---|---|
| 2062999 | 9/1992 | Canada | 224/42.03 B |
| 2666775 | 3/1992 | France | 224/42.03 B |

*Primary Examiner*—Ernest G. Cusick

[57] ABSTRACT

A new and improved mobile bicycle workstand or support apparatus includes a base member that is adapted to connect to a fixed support, such as a trailer hitch of a motor vehicle. A riser member is adjustably connected to the base member. A clamp-support member projects horizontally from the riser member, and the clamp-support member receives a tubing clamp which is used to clamp onto and support a bicycle frame. A first screw-operated clamp is provided for fixing a predetermined height adjustment and rotational adjustment between the base member and the riser member. The bicycle frame tubing clamp is rotatably connected to the clamp-support member, and a second screw-operated clamp serves to fix a predetermined angle of rotation between the clamp-support and the tubing clamp. In addition, an adjustable tray is provided that is secured to the riser member. The tray can include a liquid-retaining portion for a solvent, a drying rack for drying components cleaned by the solvent, and a magnet assembly for holding tools. By using the adjustable bicycle clamp support of the invention, a bicycle mechanic can support a bicycle on a frame tubing clamp at a continuum of heights and angles, such that the mechanic can service the bicycle from in front of, from behind, to the left of, and to the right of the bicycle.

9 Claims, 4 Drawing Sheets

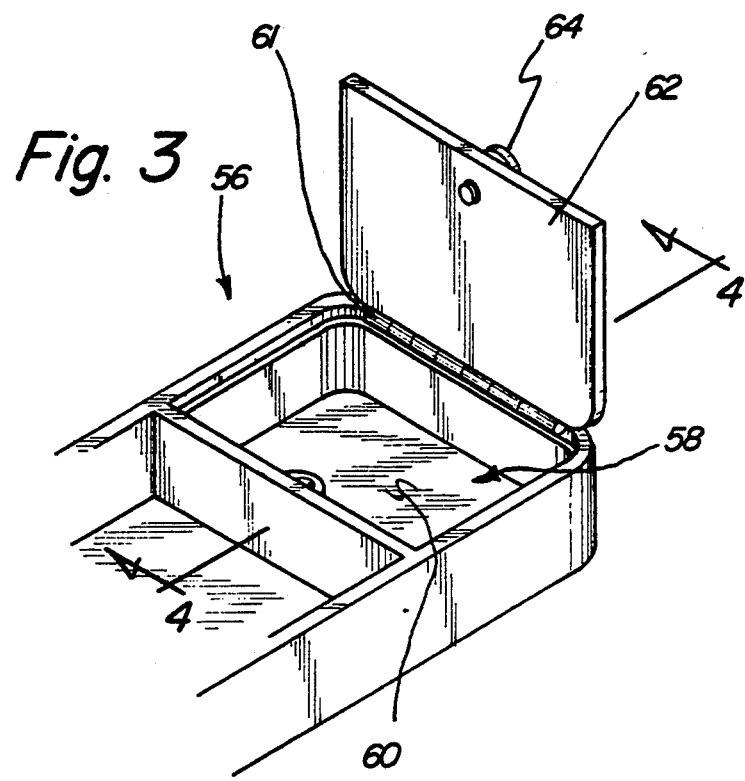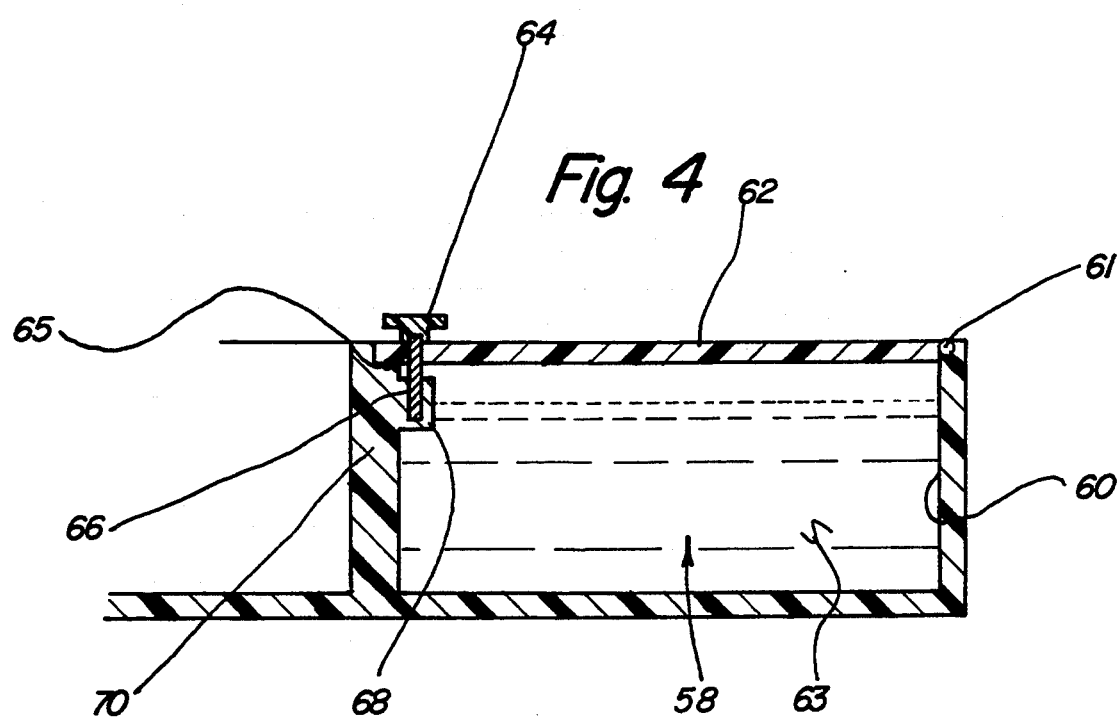

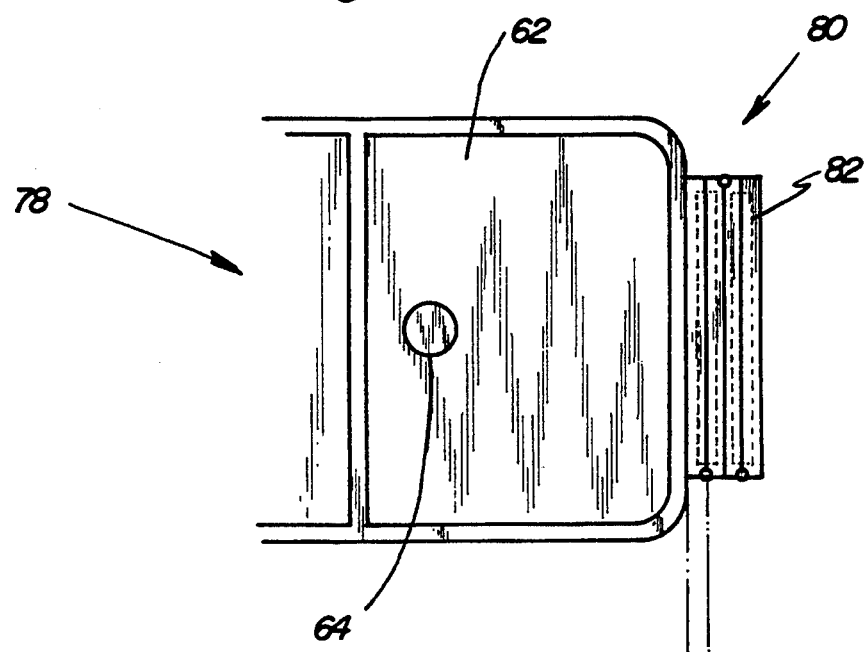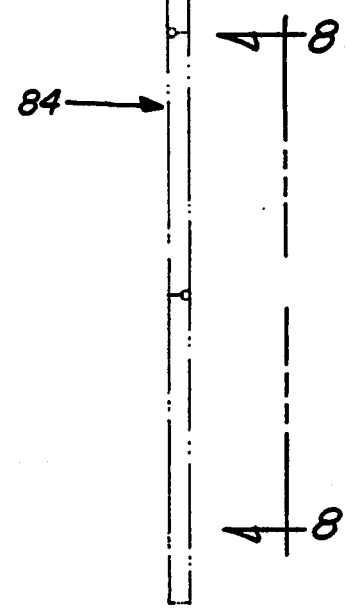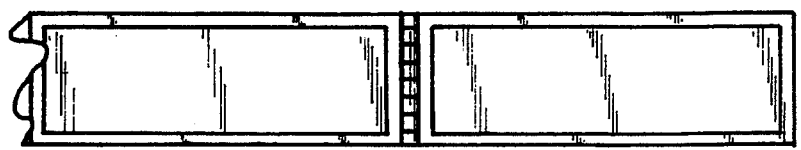

ADJUSTABLE BICYCLE CLAMP SUPPORT

This application is a continuation of application Ser. No. 08/059,064, filed May 10, 1993, now abandoned.

BACKGROUND OF THE INVENTION

1. Field of the Invention

The present invention relates generally to work stands for bicycles, and more particularly, to an adjustable bicycle clamp support especially adapted for attachment to motor vehicles.

2. Description of the Prior Art

Supports for bicycles are well known in the art. More specifically, a support for bicycles that is designed to function as a bicycle work stand is disclosed in U.S. Pat. No. 3,981,491 of Snyder which discloses a clamp for grasping a bicycle frame member and a vertical support having legs for being supported by the ground or a floor. The clamp is rotatable so that the clamped bicycle can be rotated to different orientations which facilitate working on the bicycle. However, the height of the vertical support is fixed, not permitting a vertical adjustment to accommodate workers of different heights. Moreover, the word stand disclosed in this patent is not adapted to be supported by a motor vehicle.

Supports for bicycles that are supported by motor vehicles are also known. For example, U.S. Pat. No. 4,856,686 of Workentine discloses a bicycle carrier that is attached to the back of a vehicle. One or two bicycles are supported close to the vehicle body, whereby such close positioning of the bicycles does not readily permit a person to work on the bicycles from the vehicle side of the vehicle. In addition, the support retains the bicycles in a fixed orientation and does not permit the bicycles to be rotated to different positions to facilitate working on the bicycles.

Also, U.S. Pat. No. 5,004,133 of Wyers discloses an article carrier assembly that fits onto a vehicle and that is designed to support and transport one or two bicycles. The bicycles are supported close to the vehicle body, and such close positioning of the bicycles does not permit a person to work on a bicycle from the vehicle side of the bicycle. Moreover, the support keeps the bicycle in a fixed orientation and does not permit the bicycle to be rotated to different positions to facilitate working on the bicycle.

A vertically adjustable clothing rack display is disclosed in U.S. Pat. No. Des. 294,543 of Rekow. This display provides a height adjustment of a vertical support member. However, no provision is described for either supporting a bicycle or for attaching the display to a vehicle. U.S. Pat. No. Des. 314,543 of Ott et al discloses a design of a vehicle trailer hitch adapted to carry a bicycle. The bicycle carrier portion is tray-like in appearance. However, no provision is made for providing a work stand to work on a bicycle.

There are additional important considerations that should be mentioned with respect to bicycle work stands. During many bicycle races, bicycle mechanics are usually present to handle repair and maintenance during the race. Often a mechanic will bring along a portable bicycle work stand that is usually set up on the ground. The ground is often uneven or unstable and may be soft and wet. It would be desirable if a bicycle mechanic could set up a work stand on a more even and stable surface than the ground.

Moreover, if the bicycle mechanic wishes to relocate the work stand to another location, the ground-based work stand must be loaded onto a transportation vehicle of some sort, transported to another location, and unloaded at the new location. In this respect, it would be desirable if a bicycle work stand could be retained by a transportation vehicle so that the work stand could be readily used and transported without the need for loading and unloading the vehicle at the various locations where the work stand is used.

Thus, while the foregoing body of prior art indicates it to be well known to use a ground-supported bicycle work stand, and it is well known to support bicycles on vehicles for transporting the bicycles, the provision of a simple and cost effective adjustable bicycle clamp support device, i.e. a bicycle workstand, is not contemplated that is supported by a vehicle and that permits working on a bicycle at a variety of heights and orientations. The foregoing disadvantages are overcome by the unique mobile bicycle workstand of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved mobile bicycle workstand which includes a base member that is adapted to connect to a fixed support, such as a trailer hitch or other structure of a motor vehicle. A riser member is adjustably connected to the base member. A clamp-support member projects horizontally from the riser member, and the clamp-support member receives a tubing clamp which is used to clamp onto and support bicycle frame tubing. A first screw-operated clamp is provided for fixing a predetermined height adjustment and rotational adjustment between the base member and the riser member. The tubing clamp is rotatably connected to the clamp-support member, and a second screw-operated clamp serves to fix a predetermined angle of rotation between the clamp-support and the tubing clamp. In addition, an adjustable tray is provided that is secured to the riser member. The tray can include a liquid-retaining portion for a solvent, a drying rack for drying components cleaned by solvent, and a magnet for holding tools. By using the adjustable bicycle clamp support of the invention, a bicycle mechanic can support a bicycle on a frame tubing clamp at a continuum of heights and angles, such that the mechanic can service the bicycle from in front of, from behind, to the left of, and to the right of the bicycle.

More specifically, the base member includes a hollow, cylindrical vertically projecting base member portion which has a first outer diameter. The riser member includes a hollow, cylindrical structure which has a first inner diameter. The first outer diameter is less than the first inner diameter, so that the riser member is telescopically received by the vertically projecting base member portion and is both height-adjustable and rotation-adjustable with respect to the vertically projecting base member. The clamp-support member includes a hollow, cylindrical structure which has a second inner diameter. The tubing clamp includes a cylindrical base which has a second outer diameter. The second outer diameter is less than the second inner diameter, so that the tubing clamp base is telescopically received by the clamp-support member and is both length-adjustable and rotation-adjustable with respect to the clamp-support member.

Although the preferred embodiments of the invention employ tubing clamps to clamp onto bicycle frame tubing, it is understood that the tubing clamp, is, in a general sense, a work holder. In this respect, the adjustable bicycle clamp support apparatus of the invention can be used to support other work holders which may include a vise, a C-clamp, a drill press, or a saw horse, among others.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least five preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved adjustable bicycle clamp support which has all of the advantages of the prior art and none of the disadvantages.

It is another object of the present invention to provide a new and improved adjustable bicycle clamp support which may be easily and efficiently manufactured and marketed.

It is a further object of the present invention to provide a new and improved mobile bicycle workstand support which is of durable and reliable construction.

An even further object of the present invention is to provide a new and improved mobile bicycle workstand which is susceptible of a low cost of manufacture with regard to both materials and labor, and which accordingly is then susceptible of low prices of sale to the consuming public, thereby making such mobile bicycle workstand available to the buying public.

Still yet a further object of the present invention is to provide a new and improved mobile bicycle workstand that a bicycle mechanic could set on a more even and more stable surface than the ground.

Yet another object of the present invention is to provide a new and improved mobile bicycle workstand that can be retained by a transportation vehicle so that the support can be readily used and transported without the need for loading and unloading the vehicle at the various locations where the support is used.

Yet another object of the present invention is to provide a new and improved mobile bicycle workstand in which the height is adjustable vertically to accommodate workers of different heights.

Still another object of the present invention is to provide a new and improved mobile bicycle workstand that is supported a sufficient distance away from a vehicle body to permit a person to work on the bicycle from the vehicle side of the bicycle.

Yet another object of the present invention is to provide a new and improved mobile bicycle workstand that is attached to a vehicle and that permits the bicycle to be rotated to different positions to facilitate working on the bicycle.

Still another object of the present invention is to provide a new and improved mobile bicycle workstand that includes a tray for holding tools for repairing a bicycle.

Yet another object of the present invention is to provide a new and improved adjustable work holder support in which the height is adjustable vertically to accommodate workers of different heights.

These together with still other objects of the invention, along with the various features of novelty which characterize the invention, are pointed out with particularity in the claims annexed to and form a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a partial perspective view of a second embodiment of a tray assembly that can be affixed to the riser member of the embodiment of the mobile bicycle workstand shown in FIG. 1.

FIG. 4 is a partial cross-sectional view of the tray assembly shown in FIG. 3 taken along the line 4—4.

FIG. 7 is a partial elevational view of a fourth embodiment of a tray assembly that can be affixed to the riser member of the embodiment of the mobile bicycle workstand shown in FIG. 1.

FIG. 8 is a partial cross-sectional view of a portion of a magnet array of the tray assembly shown in FIG. 5 taken along the line 8—8.

DESCRIPTION OF THE PREFERRED EMBODIMENT

With reference to the drawings, a new and improved mobile bicycle workstand embodying the principles and concepts of the present invention will be described.

Figure 1:
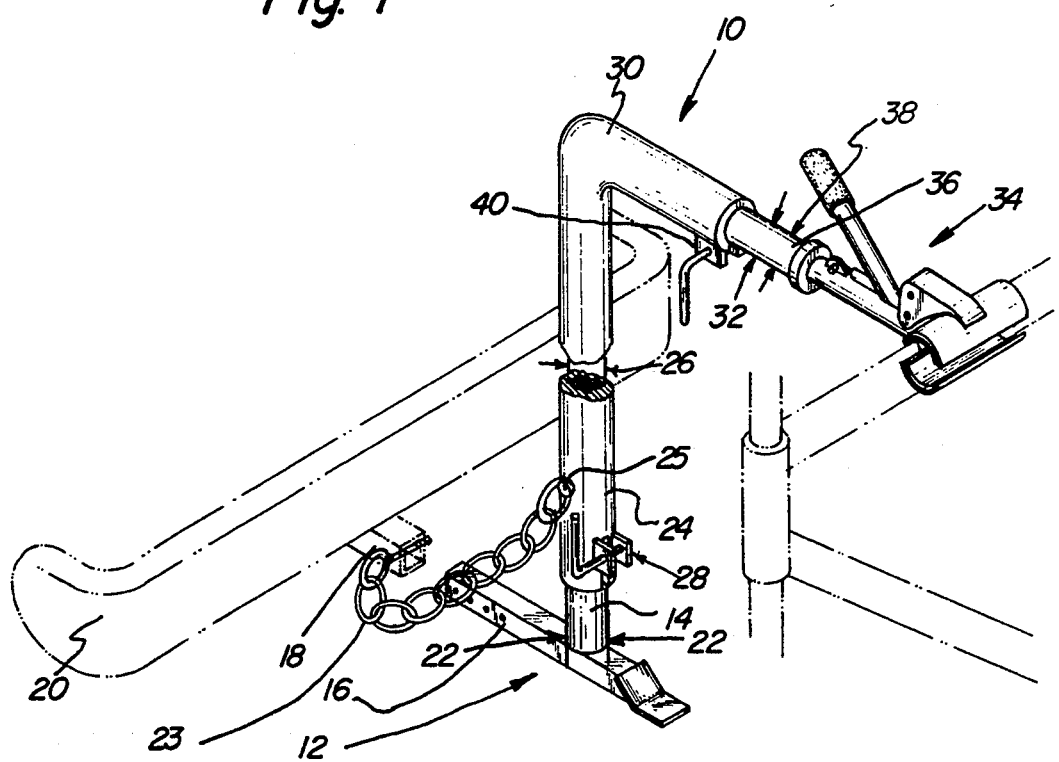
FIG. 1 is a perspective view showing a first preferred embodiment of the mobile bicycle workstand of the invention.

Turning initially to FIG. 1, there is shown a first exemplary embodiment of the mobile bicycle workstand of the invention generally designated by reference numeral 10. In its preferred form, mobile bicycle workstand 10 includes a base member 12 which includes a vertically projecting base member portion 14 and a horizontally projecting base member portion 16 that projects from the vertically projecting base member portion 14, and that is adapted to connect to a fixed support, which is trailer hitch 18 on a non-moving motor vehicle whose bumper 20 is shown. The vertically projecting base member portion 14 is comprised of a hollow, cylindrical structure having a first outer diameter 22.

A riser member 24 is adjustably connected to the vertically projecting base member portion 14 for height adjustment and for rotational adjustment between the base member 12 and the riser member 24. The riser member 24 is comprised of a hollow, cylindrical structure having a first inner diameter 26. The first outer diameter 22 is less than the first inner diameter 26, so that the riser member 24 is telescopically received by the vertically projecting base member portion 14 and is both height-adjustable and rotation-adjustable with respect to the vertically projecting base member 14.

A first screw clamp assembly 28 is provided for fixing a predetermined height adjustment and a predetermined rotation adjustment between the vertically projecting base member portion 14 and the riser member 24. The first screw clamp assembly 28 fixes the height and rotation adjustments by flexing the riser member 24 slightly out of cylindrical shape to cause the riser member 24 clamp upon the vertically projecting base member 14.

A clamp-support member 30 projects horizontally from the riser member 24. In FIG. 1, the clamp-support member 30 and the riser member 24 are a unified, one-piece structure. The clamp-support member 30 is comprised of a hollow, cylindrical structure having a second inner diameter 32.

A tubing clamp 34 has jaws 35 for clamping tubing of a bicycle frame 37. The tubing clamp 34 is rotatably connected to the clamp-support member 30. The tubing clamp 34 includes a cylindrical tubing clamp base 36 which has a second outer diameter 38. The second outer diameter 38 is less than the second inner diameter 32, so that the tubing clamp base 36 is telescopically received by the clamp-support member 30 and is both length-adjustable and rotation-adjustable with respect to the clamp-support member 30. The tubing clamp 34 shown in FIG. 1 is a conventional tubing clamp that is readily commercially available.

Alternatively, other work holders such as a vise, a C-clamp, a drill press, or a saw horse, among others, can have a cylindrical base (similar to base 36) and be adjusted as to length and rotation with respect to clamp-support member 30.

A second screw clamp assembly 40 is provided for fixing a predetermined length adjustment and a predetermined angle of rotation between the clamp-support 30 and the tubing clamp 34. The second screw clamp assembly 40 fixes the length and angle of rotation adjustments by flexing the clamp-support member 30 slightly out of cylindrical shape to cause the clamp-support member 30 to clamp upon the cylindrical tubing clamp base 36.

Although FIG. 1 shows the adjustable bicycle clamp support 10 of the invention about to be secured to the fixed support of a non-moving motor vehicle, the adjustable bicycle clamp support 10 of the invention can be secured to other fixed supports such as, for example, a suitable receptacle mounted on the tailgate of a truck, or a workbench or table leg in an indoor workshop.

A chain 23 can also be employed to secure the adjustable bicycle clamp support 10 of the invention to a fixed element, such as the trailer hitch 18 on the motor vehicle. One end of the chain 23 is secured to a pin attached to the trailer hitch 18, and the other end of the chain 23 is attached to a rivet or similar fastener 25 suitably fixedly secured to the riser member 24 substantially as shown.

Figure 2:
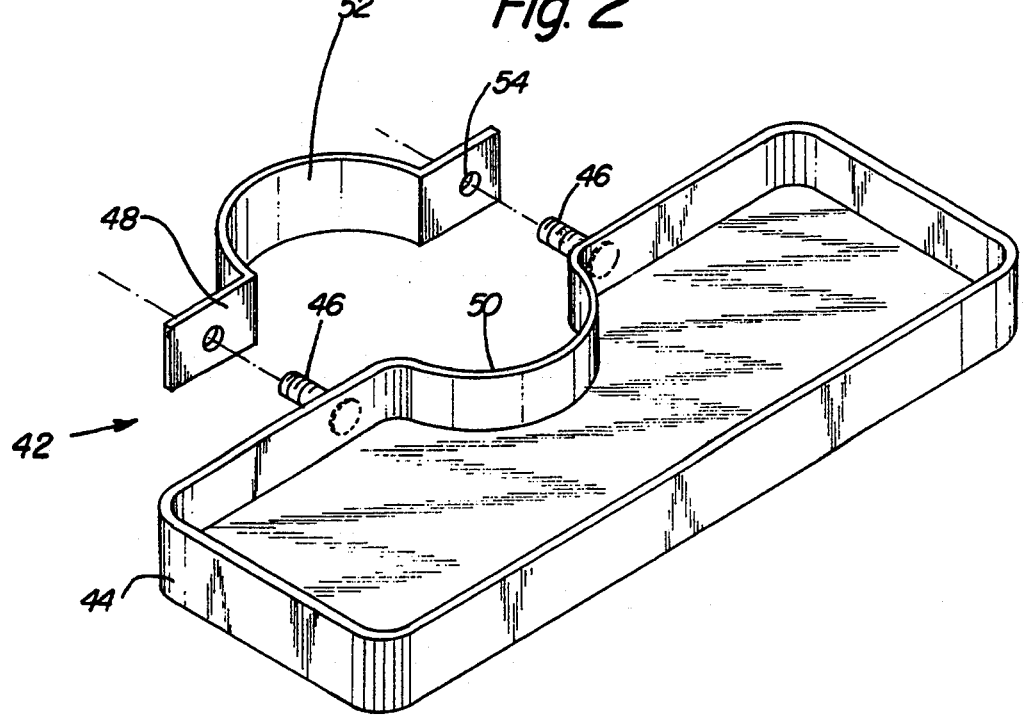
FIG. 2 is a perspective and partially exploded view of a first embodiment of a tray assembly that can be affixed to the riser member of the embodiment of the mobile bicycle workstand shown in FIG. 1.

Turning to FIG. 2, a first tray assembly 42 is shown which can be adjustably connected to the riser member 24. The tray assembly 42 includes a tray element 44, fasteners 46, and a clamp strap 48. The tray element 44 has a curved surface 50 which is complementary to the outer surface of the riser member 24. In addition, the clamp strap 48 has a curved surface 52 which is complementary to the outer surface of the riser member 24. When the respective complementary surfaces 50 and 52 are matched with the riser member 24, the fasteners 46 are employed to fasten the clamp strap 48 to the tray element 44, and the riser member 24 is sandwiched therebetween. As indicated in FIG. 2, the fasteners 46 have threads, and these threads may engage complementary threads in orifices 54 in the clamp strap 48. In this way, the tray assembly 42 can be adjusted both vertically and rotationally along the riser member 24.

Turning to FIGS. 3 and 4, reference numerals are shown that correspond to like reference numerals that designate like elements shown in the other figures. In addition, a second tray assembly 56 includes a liquid-tight receptacle 58 for storing a quantity of a solvent 63. The receptacle 58 includes a solvent compartment 60 and a hinged lid 62. The hinged lid 62 is secured to the solvent compartment 60 by means of a hinge 61 and a threaded thumb screw 64 that screws into a complementarily threaded hole 66 located in a flange 68 that projects from wall 70 of the compartment 60. Liquid sealing materials, such as an O-ring 65 can be provided between the hinged lid 62 and the compartment 60. The solvent 63 can be used for cleaning grease and grime off of bicycle parts that are undergoing repair.

Figure 5:
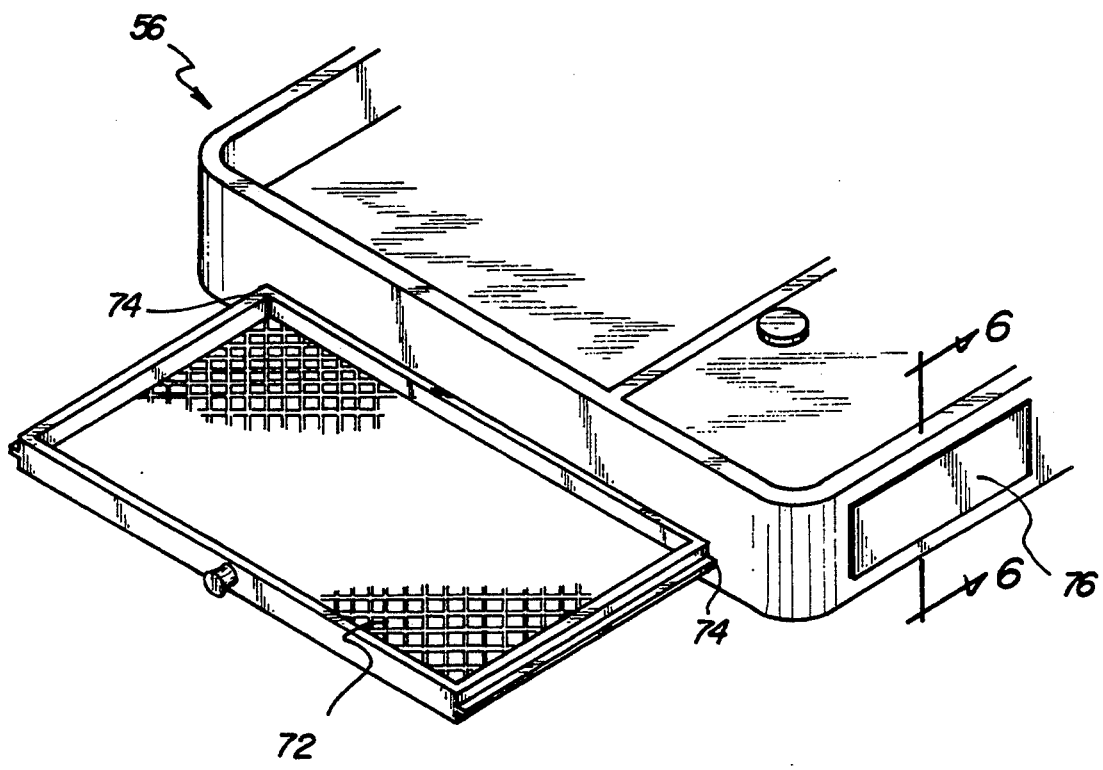
FIG. 5 is a partial perspective view of a third embodiment of a tray assembly that can be affixed to the riser member of the embodiment of the mobile bicycle workstand shown in FIG. 1.
Figure 6:
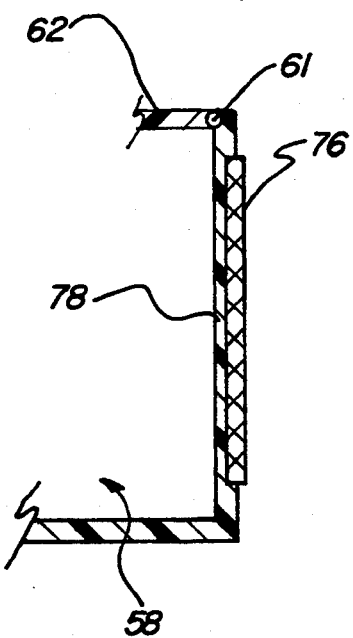
FIG. 6 is a partial cross-sectional view of the tray assembly shown in FIG. 5 taken along the line 6—6.

Turning to FIGS. 5 and 6, reference numerals are shown that correspond to like reference numerals that designate like elements shown in the other figures. In addition, tray assembly 56 includes a drying rack 72 that slides in and out of a receiving slot 74 located in the body of the tray assembly 56. The drying rack 72 can be used to dry parts that have been cleaned by the solvent 63.

Also present on tray assembly 56 is a magnet 76 that is fixed to wall 78 of the liquid-tight receptacle 58. The magnet 76 can be used to retain ferromagnetic tools on the tray assembly 56 so that those tools are readily available and so that tools are not misplaced when hands of the bicycle mechanic are full installing a bicycle on the adjustable bicycle clamp support 10 of the invention.

Turning to FIGS. 7 and 8, reference numerals are shown that correspond to like reference numerals that designate like elements shown in the other figures. In addition, FIGS. 7 and 8 show a fourth tray assembly 78 in which a magnet assembly 80 includes a plurality of interconnected, head-to-tail hinged magnet elements 82. In FIG. 7, the magnet elements 82 are in the folded orientation in the real view. In a phantom view, the magnet elements 82 have been unfolded and are in a linear array 84. More specifically with reference to FIG. 8, the magnet elements 82 are comprised of a base panel member 86 and a flat magnet 88 secured to the base panel member 86 in a conventional way, such as with a suitable adhesive for the materials involved.

The adjustable bicycle clamp support of the invention can be fabricated from schedule 40 pipe that is readily shaped and welded with conventional apparatus. If desired, the adjustable bicycle clamp support of the invention can be made from lighter materials.

It is apparent from the above that the present invention accomplishes all of the objects set forth by providing a new and improved adjustable bicycle clamp support that is low in cost, relatively simple in design and operation, and which may advantageously be used for the repair and maintenance of bicycles.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved adjustable bicycle clamp support apparatus, comprising:
   base member which includes a vertically projecting base member portion and a horizontally projecting base member portion that projects from said vertically projecting base member portion, and that is adapted to connect to a fixed support, wherein said vertically projecting base member portion includes a cylindrical structure defining a first vertical axis;
   a riser member, adjustably connected to said vertically projecting base member portion for height adjustment between said base member and said riser member, wherein said riser member includes a cylindrical structure defining a second vertical axis, said riser member being telescopically fitted to said vertically projecting base member portion such that said first axis is coaxial with respect to said second axis and said riser member is adapted to be both slidably and rotatably displaced relative to said vertically projecting base member portion and is both height-adjustable and rotation-adjustable with respect to said vertically projecting base member;
   means for fixing a predetermined height adjustment and a predetermined rotation adjustment between said base member and said riser member;
   a clamp-support member projecting horizontally from said riser member, wherein said clamp-support member includes a cylindrical structure defining a third axis;
   a tubing clamp, rotatably connected to said clamp-support member, wherein said tubing clamp includes a cylindrical tubing clamp base, defining a fourth axis said tubing clamp base being telescopically fitted to said horizontally projecting clamp-support member portion such that said third axis is coaxial with respect to said fourth axis and said tubing clamp base is adapted to be both slidably and rotatably displaced relative to said horizontally projecting clamp-support member and is both length-adjustable and rotation-adjustable with respect to said clamp-support member; and
   means for fixing a predetermined length adjustment and a predetermined angle of rotation between said clamp-support member and said tubing clamp base.

2. The apparatus described in claim 1 wherein said means for fixing a predetermined height adjustment and a predetermined rotation adjustment between said base member and said riser member includes moans for flexing said riser member out of cylindrical shape to clamp upon said vertically projecting base member.

3. The apparatus described in claim 1 wherein said means for fixing a predetermined length adjustment and a predetermined angle of rotation between said clamp-support member and said tubing clamp includes means for flexing said clamp-support member out of cylindrical shape to clamp upon said tubing clamp base.

4. A new and improved adjustable bicycle clamp support apparatus, comprising:
   a base member which includes a vertically projecting base member portion and a horizontally projecting base member portion that projects from said vertically projecting base member portion, and that is adapted to connect to a fixed support;
   a riser member, adjustably connected to said vertically projecting base member portion for height adjustment between said base member and said riser member;
   means for fixing a predetermined height adjustment between said base member and said riser member;
   a clamp-support member projecting horizontally from said riser member;
   a tubing clamp, rotatably connected to said clamp-support member;
   means for fixing a predetermined angle of rotation between said clamp-support member and said tubing clamp, and
   a tray assembly; and
   means for adjustably connecting said tray assembly to said riser member.

5. The apparatus described in claim 4 wherein said riser member and said clamp-support member form a one-piece structure.

6. The apparatus described in claim 4 wherein said tray assembly includes a liquid-tight receptacle for storing a quantity of a solvent.

7. The apparatus described in claim 4 wherein said tray assembly includes a drying rack.

8. The apparatus described in claim 4 wherein said tray assembly includes a magnet assembly located on an outer wall of said tray for retaining ferromagnetic tools.

9. The apparatus described in claim 8 wherein said magnet assembly includes a plurality of interconnected, hinged magnet elements that are capable of being folded into a storage position and of being unfolded into a linear array of magnet elements.

* * * * *